United States Patent [19]

Kurosawa

[11] Patent Number: 4,556,885

[45] Date of Patent: Dec. 3, 1985

[54] SYSTEM FOR DETECTING POSITION OR SPEED

[75] Inventor: Ryoichi Kurosawa, Tokyo, Japan

[73] Assignee: Tokyo Shibaura Denki Kabushiki Kaisha, Kanagawa, Japan

[21] Appl. No.: 415,182

[22] Filed: Sep. 7, 1982

[30] Foreign Application Priority Data

Jan. 26, 1982 [JP] Japan .................................... 57-9554

[51] Int. Cl.$^4$ ............................................... G05B 1/02
[52] U.S. Cl. .............................. 340/870.25; 324/167; 318/608; 340/870.31
[58] Field of Search ................................ 318/606–608, 318/654, 661; 324/160, 167, 207, 208; 340/870.25, 870.32, 870.34, 870.31; 364/174, 178, 179, 474

[56] References Cited

U.S. PATENT DOCUMENTS

| | | | |
|---|---|---|---|
| 3,634,838 | 1/1972 | Granqyist | 340/870.25 |
| 4,034,276 | 7/1977 | Hyatt | 318/608 |
| 4,047,086 | 9/1977 | Cocksedge | 318/606 |
| 4,243,921 | 1/1981 | Tamura | 340/870.25 |
| 4,253,051 | 2/1981 | Schneider | 340/870.34 |
| 4,282,468 | 8/1981 | Barker | 318/608 |
| 4,310,790 | 1/1982 | Mulet-Marquis | 318/608 |
| 4,319,172 | 3/1982 | Sieradzki | 318/608 |
| 4,334,179 | 6/1982 | Grimes | 340/870.34 |
| 4,342,077 | 7/1982 | Passey | 318/608 |
| 4,358,722 | 11/1982 | Iwakene | 340/870.25 |
| 4,481,588 | 11/1984 | Komiya | 364/174 |

Primary Examiner—John W. Caldwell, Sr.
Assistant Examiner—Michael F. Heim
Attorney, Agent, or Firm—Stevens, Davis, Miller & Mosher

[57] ABSTRACT

A system for detecting mechanical movement of a body under detection formed of: a synchro generator having a primary and a secondary windings, one of which is capable of being coupled to the body; an exciting circuit for providing exciting current to the primary winding; a reference signal generator for providing a reference signal of a predetermined frequency; a first circuit producing pulses at a frequency which changes depending on the phase difference between the reference signal and the signal induced in the secondary winding; and a frequency-divider counting the pulses and producing a first digital signal indicative of the count value at each moment. The first digital signal is supplied to the exciting circuit which determines the instantaneous value of the exciting current at each moment. The synchro generator, the reference signal generator, the first circuit, the frequency-divider and the exciting circuit form a phase-locked-loop controlling the induced voltage so as to be in a predetermined phase-relationship with the reference signal. There is further provided a device responsive to the phase-locked-loop for producing a second digital signal relating to the movement of the body under detection.

17 Claims, 21 Drawing Figures

SYSTEM FOR DETECTING POSITION OR SPEED

BACKGROUND OF THE INVENTION

The invention relates to a digital system for detecting position or speed of a body under detection to produce a digital signal indicative of the position or the speed of the body or to produce pulses in synchronism with the movement.

In the past, a tachometer generator having the same construction as a DC generator was used for detecting the rotational speed of a rotating body. Detection of the speed or the position of linear movement of a body was achieved by converting the linear movement into rotation by means of gears or the like, and by detecting the rotation in a similar manner.

The signals indicative of the speed and the position thus detected are often used as feedback signals. When the feedback control system is composed of analog circuits, the analog signals from the tachometer generator are convenient.

However, in recent years, control systems often comprise digital circuits including microcomputers, use of which makes it possible to improve accuracy and stability of control. In addition, a digital system has a smaller number of devices which require adjustment and use of a microcomputer reduces the cost of the system.

When a digital control system is used, an analog feedback signal must be converted into a digital signal, by means of an analog-to-digital converter. But, the converted digital signal is less accurate and less stable than the original analog signal, so that advantages of a digital system are reduced. Moreover, tachometer generators and potentiometers are associated with mechanically sliding parts, which require frequent inspection and maintenance, which are troublesome and costly.

In another conventional speed detection system, a rotary pulse generator or a frequency generator generating an output of a frequency proportional to the rotational speed is used. The number of pulses generated is counted and a digital signal indicative of the detected speed is produced. This system has a disadvantage in that detection with high accuracy cannot be achieved unless the number of pulses generated during one revolution is very large. For instance, when the rotational speed of 960 rpm (=16 rps) is to be detected at a sampling period of 10 m sec. and with a resolution of 12 bits, i.e., about 0.025% ($=2^{-12}$), a pulse generator producing 25,600 pulses per revolution is required. This means the output of the pulse generator is more than 400 KHz when the detected speed is 960 rpm, and transmitting a pulse signal of such a high frequency from the pulse generator to a control device is not easy. Moreover, such a pulse generator will have very delicate construction, and is therefore difficult to handle, and is costly.

SUMMARY OF THE INVENTION

An object of the invention is to provide a system for detecting position or speed of a body under detection and producing a digital signal indicative of the position, the speed or the like, in which detection is made at a high resolution and at a short sampling period and in which transmission and processing of the signal are easy.

The foregoing object and other objects of the invention have been achieved by the provision of a system for detecting position or speed of a body under detection comprising: a synchro generator having a primary and a secondary winding, one of which is capable of being coupled to said body; an exciting circuit for providing exciting current to said primary winding; said secondary winding inducing a signal when said primary winding is excited; a reference signal generator for providing a reference signal of a predetermined frequency; first means responsive to the reference signal and the induced signal from said secondary winding, for producing pulses at a frequency which changes depending on the phase difference between the reference signal and the induced signal; a frequency-divider counting said pulses and producing a first digital signal indicative of the count value at each moment; said exciting circuit being responsive to the first digital signal from the frequency-divider for determining the instantaneous value of the exciting current at each moment; said synchro generator, said reference signal generator, said first means, said frequency-divider and said exciting circuit forming a phase-locked-loop controlling the induced voltage so as to be in a predetermined phase-relationship with the reference signal; and second means responsive to the phase-locked-loop for producing a second digital signal relating to the position or speed of said body under detection.

DETAILED DESCRIPTION OF THE PREFERRED EMBODIMENTS

Figure 1:
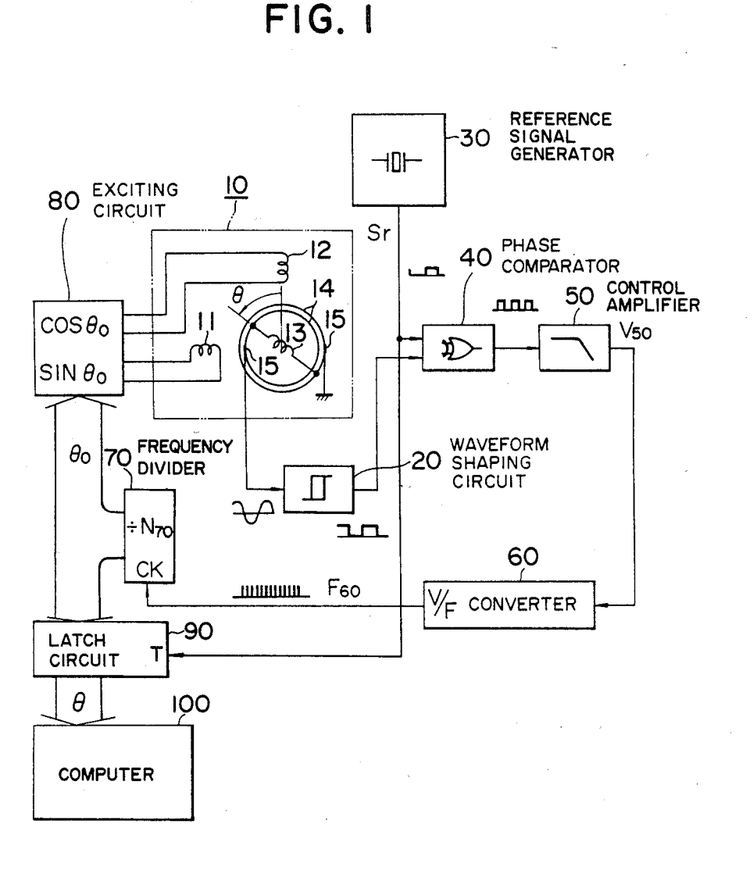
FIG. 1 is a block diagram showing an embodiment of the invention.

Referring now more particularly to FIG. 1, there is shown an embodiment of the invention, in which a numeral 10 denotes an inductive type rotary detector or a synchro generator having two poles, which includes a stator and a rotor movable relative to each other. The rotor is capable of being coupled to a body under detection. Two-phase primary windings 11 and 12 are mounted on the stator. A single-phase secondary winding 13 is mounted on the rotor. Slip rings 14 and brushes 15 in contact with the slip rings 14 serve to connect the winding 13 to an external circuitry, which will be described later, and, in operation, voltage Vi induced in the winding 13 is transmitted to the control circuitry.

Figure 2A:
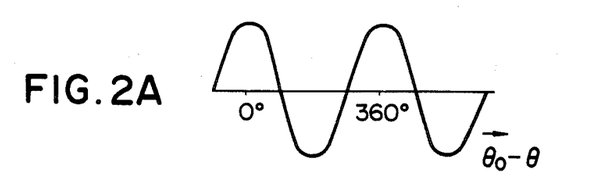
FIGS. 2A–2D and 3A–3D are diagrams showing the waveforms of the signals appearing at various parts of the system shown in FIG. 1.
Figure 2B:
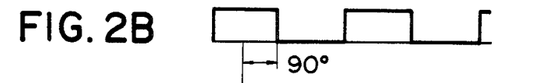
Figure 3A:
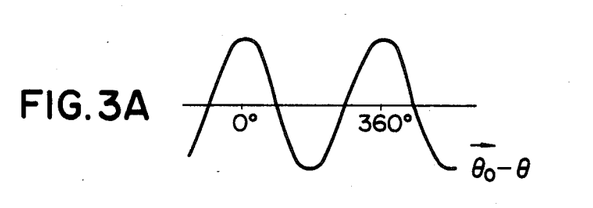
Figure 3B:
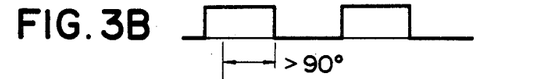

The external circuitry includes a waveform shaping circuit 20 which receives the voltage, shown in FIGS. 2A, 3A, induced in the winding 13 and shapes or converts it into a square waveform signal, shown in FIGS. 2B, 3B, having a high level during the positive half cycle of the induced voltage and a low level during the negative half cycle of the induced voltage.

Figure 2C:
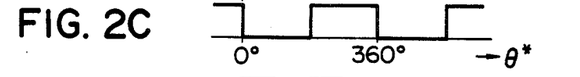
Figure 2D:
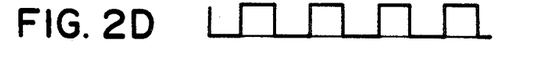
Figures 3C, 3D:
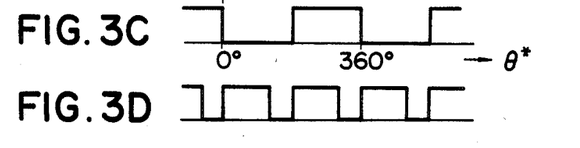

A reference signal generator 30 generates a square wave reference signal Sr, shown in FIGS. 2C, 3C, of a predetermined constant frequency. A phase comparator 40, which may be composed of an EXCLUSIVE-OR gate, receives the square wave signals from the waveform shaping circuit 20 and the reference signal generator 30 and produces a phase difference signal, FIGS. 2D, 3D, indicative of the phase difference between the two inputted signals. The phase difference signal is in the form of pulses (except when the two inputted signals are precisely in phase) at a frequency twice that of the inputted signals, in steady state, i.e., when the two inputted signals have the constant frequency, and ON/OFF ratio (ratio of ON or high level period to OFF or low level period) is 1 as shown in FIG. 2D when the output of the circuit 20 lags behind the output of the circuit 30 by 90°. The ON/OFF ratio is greater as shown in FIG. 3D when the output of the circuit 20 lags by a greater angle.

A control amplifier 50 receives the output of the phase comparator 40 and produces a voltage signal $V_{50}$ corresponding thereto. Besides providing a control action, e.g., a proportional plus integral control action, the control amplifier 50 has a function of a low-pass filter removing the AC components thereby to obtain a DC voltage signal indicative of the phase difference. The control amplifier 50 operates in such a manner that, when the ON/OFF ratio of the output of the phase comparator 40 is 1, the output level of the control amplifier 50 is kept unchanged; when the ON/OFF ratio is greater than 1, the output level is increased; and when the ON/OFF ratio is smaller than 1, the output level is decreased.

A voltage to frequency converter (hereinafter referred to as a V/F converter) 60 receives the output of the control amplifier 50 and produces pulses at a frequency $F_{60}$ proportional to the output of the control amplifier 50.

A frequency divider 70 counts the output pulses of the converter 60, and produces the count value in the form of a digital signal indicative of the electric phase angle $\theta_0$. The digital signal is therefore of a value which changes at a rate proportional to the output voltage of the control amplifier 50, and which, when it reaches a value corresponding to 360°, returns to zero.

An exciting circuit 80 receives the count value $\theta_0$ from the frequency divider 70 and produces two signals having magnitudes proportional to $\sin\theta_0$ and $\cos\theta_0$. The successions of these two signals form, as far as the rate of the change of $\theta_0$ is substantially constant, substantially sinusoidal waveforms of 90° apart from each other, i.e., $E \sin\theta_0$ and $E \cos\theta_0$, with E being a constant and $\theta_0$ varying. The outputs of the exciting circuit 80 are applied to the primary windings 11, 12.

Thus, the synchro generator 10 and the circuits 20, 30, 40, 50, 60, 70 and 80 form a phase locked loop (PLL) which compares the phases of two signals and serves to keep a certain phase-relationship between the two signals. By the function of the PLL, the output $\theta_0$ of the frequency divider 70 is so controlled that the induced voltage Vi is kept in a certain phase-relationship with the reference signal Sr, i.e., the positive peaks of the induced voltage Vi coincide with the trailing edges of the reference signal Sr. As long as the above-mentioned phase-relationship is maintained, and hence the ON/OFF ratio is kept at "1(one)", then the output level of the control amplifier 50 is kept constant, the output frequency $F_{60}$ of the V/F converter 60 is kept constant, and the rate of change of $\theta_0$ outputted by the frequency divider 70, i.e., the frequency of the exciting currents is kept constant. When the induced voltage Vi lags to result in ON/OFF ratio of greater than 1, then the output level of the control amplifier 50 is increased, the output frequency $F_{60}$ of the V/F converter 60 is increased, and the rate of change of $\theta_0$ outputted by the frequency divider 70, and hence the frequency of the exciting currents are increased, so that the induced voltage Vi is advanced to catch up with the reference signal Sr. When the induced voltage Vi leads, then the output frequency of the V/F converter 60 is decreased and the frequency of the exciting currents is decreased, so that the induced voltage Vi is retarded to be in line with the reference signal Sr.

As has been described, the PLL serves to maintain the following relationship.

$$\theta_0 - \theta = \theta^*$$

hence, $$\theta = \theta_0 - \theta^*$$

$\theta_0$ and $\theta^*$ are the angles of the outputs of the frequency divider 70 and the reference signal generator. Accordingly, if signals indicative of the values $\theta_0$ and $\theta^*$ are obtained, the value of $\theta$ can be determined by subtracting $\theta^*$ from $\theta_0$.

Alternatively, if a timing pulse is produced when either of $\theta_0$ and $\theta^*$ is at a specific value, say $T_0$ or $T^*$, and a signal indicative of the value of the other of $\theta_0$ and $\theta^*$ is obtained, then the value of $\theta$ can be determined either by subtracting $T^*$ from $\theta_0$, or $\theta^*$ from $T_0$. If such a timing pulse is produced when either of $\theta_0$ and $\theta^*$ is 0 (zero), the value of $\theta$ is equal to $\theta_0$ or $-\theta^*$.

In the embodiment of FIG. 1, the value of $\theta_0$ at the moment of $\theta^*=0$ is read and used as the value indicative of $\theta$. To materialize this concept a latch circuit 90 is provided, which receives the reference signal Sr from the reference signal generator 30, and reads and stores the count value $\theta_0$ from the frequency divider 70 when the trailing edge of the reference signal Sr appears, i.e., when $\theta^*=0$. The output of the latch circuit 90 is indicative of the value of $\theta$, i.e., the position of the body under detection, at the last previous occurrence of the trailing edge of the reference signal Sr, and changes each time the trailing edge appears, i.e., every cycle of the reference signal.

A computer, such as a microcomputer 100 reads the values stored in the latch circuit 90 and performs the arithmetic operation to determine the speed of the body under detection, and to control the position or the speed of the body under detection.

The speed of the body can be determined in accordance with the difference between the successive readings of the latch circuit 90 since the length of the period of one cycle of the reference signal Sr is constant.

Figure 4:
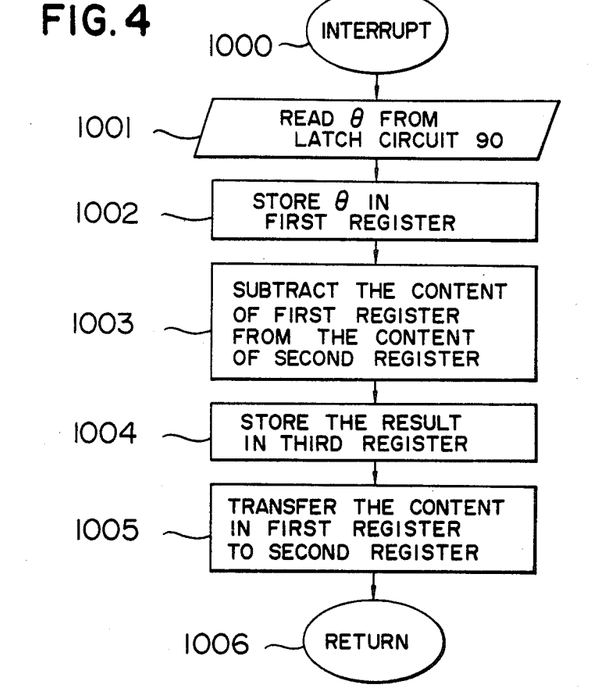
FIG. 4 is a flow chart showing the operation of the computer 100 shown in FIG. 1.

The procedure for determining the speed is shown in FIG. 4. The trailing edge of the reference signal Sr is used for initiating interrupt (step 1000). Then, the value $\theta$ stored in the latch circuit 90 is read and stored in a first register, not shown, (1001, 1002). The value stored in the first register is subtracted from the value stored in a second register, not shown, which is the value read out of the latch circuit 90 in the last previous cycle (1003). The result, i.e., the difference obtained is indicative of the speed, and is stored in a third register, not shown, for further use or processing (1004). Then, the value in the first register is transferred into the second register (1005). This concludes the interrupt program, and return to the main program is effected (1006).

For further description of the embodiment of FIG. 1, it is assumed, for instance, the maximum rotational speed is 1920 rpm. Assume, also, that the desired resolution in detection of position is 15 bits, i.e., $2^{-15} \times 360°$ ($\approx 0.003\% \times 360°$). In this case, the output of the frequency divider 70 comprises a counter of 15 bits. In other words, the dividing factor $N_{70}$ of the frequency divider is $2^{15} = 32,768$.

Since the PLL serves to maintain the relationship:

$$\theta_0 - \theta = \theta^*,$$

$$\frac{d}{dt}(\theta_0 - \theta) = \frac{d}{dt}\theta^*$$

$$\therefore \frac{d}{dt}\theta_0 - \frac{d}{dt}\theta = \frac{d}{dt}\theta^*$$

i.e., $\omega_0 - \omega = \omega^*$ where $\omega_0$, $\omega$, $\omega^*$ are angular frequencies, and $$\omega_0 = \frac{d}{dt}\theta_0, \omega = \frac{d}{dt}\theta, \omega^* = \frac{d}{dt}\theta^*.$$

Hence, $$f_0 - f = f^*$$

where $f_0$, $f$, $f^*$ are frequencies and $$f_0 = \frac{1}{2\pi}\omega_0, f = \frac{1}{2\pi}\omega, f^* = \frac{1}{2\pi}\omega^*.$$

The frequency f may take a value in the range between $-f_{max}$ and $f_{max}$, $f_{max}$ being the maximum frequency corresponding to the maximum rotational speed, in one or forward direction, of the body under detection.

The frequency $f_0$ of the exciting currents may take a value over the range between $(f^* - f_{max})$ and $(f^* + f_{max})$, $f_{max}$ corresponding to the maximum rotational speed of 1920 rpm = 32 Hz. In deciding the frequency f* of the reference signal generator, the following points have to be regarded. First, the result of the subtraction $f^* - f_{max}$ should be positive. Secondly, the noise of a frequency 2f* has to be removed or suppressed by the filtering function of the control amplifier 50, and hence the cut-off frequency of the control amplifier 50 is selected to be one half to one third of 2f*. On the other hand, the lower cut-off frequency is associated with the slower response so that the cut-off frequency has to be as high as possible.

From these considerations, the frequency f* of the reference signal Sr is selected, for instance, to be 128 Hz. The cut-off frequency of the control amplifier 50 is selected to be less than 100 Hz.

The maximum frequency $f_{0max}$ of the exciting current is $f^* + f_{max} = 128 + 32 = 160$ Hz. Since the dividing factor $N_{70}$ of the frequency divider 70 is 32,768, the V/F converter 60 needs to be capable of producing an output up to about 5.3 MHz ($\approx 160 \times 32,768$).

The latch circuit 90 is selected to be one having 15 bits, the same as the frequency divider 70.

With the arrangement described above, the detection of the position $\theta_0$ of the body under detection is made every sampling period of 7.8 m sec., and the detected value has a resolution of $2^{-15} \times 360°$.

The detection of the rotational speed is also made every sampling period of 7.8 m sec. The number of bits of the detected value of the speed depends on the speed. If the speed is 960 rpm (=16 rps), there occurs $\frac{1}{8}$ ($=2^{-3}$) rotation over the sampling period of 7.8 m sec., so that the detected value is given as a value of 12 bits.

Figure 5:
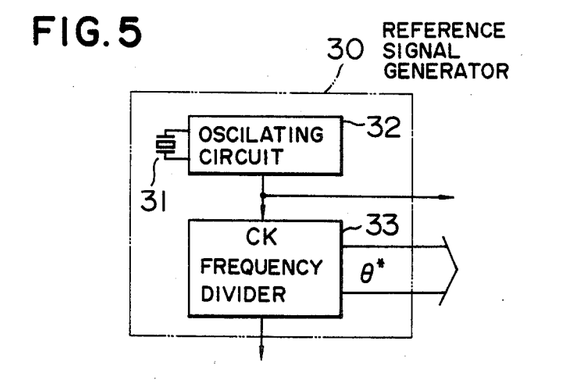
FIG. 5 is a block diagram showing the internal construction of an example of the reference signal generator 30 shown in FIG. 1.

FIG. 5 shows an internal construction of an example of the reference signal generator 30. As illustrated, the reference signal generator 30 comprises a crystal oscillator 31, an oscillating circuit 32 cooperating with the crystal oscillator 31 for producing a signal of a frequency of, say $2^{22}$ Hz (=4,194,304 Hz), and a frequency divider 33 comprising a counter of 15 bits which receives the output of the oscillating circuit 32 and divides it by the dividing factor of $2^{15}$ (=32,768) to produce a reference signal of 128 Hz. Use of the crystal oscillator 31 is advantageous in that the resultant oscillation is stable and the oscillating frequency is accurate.

Figure 6:
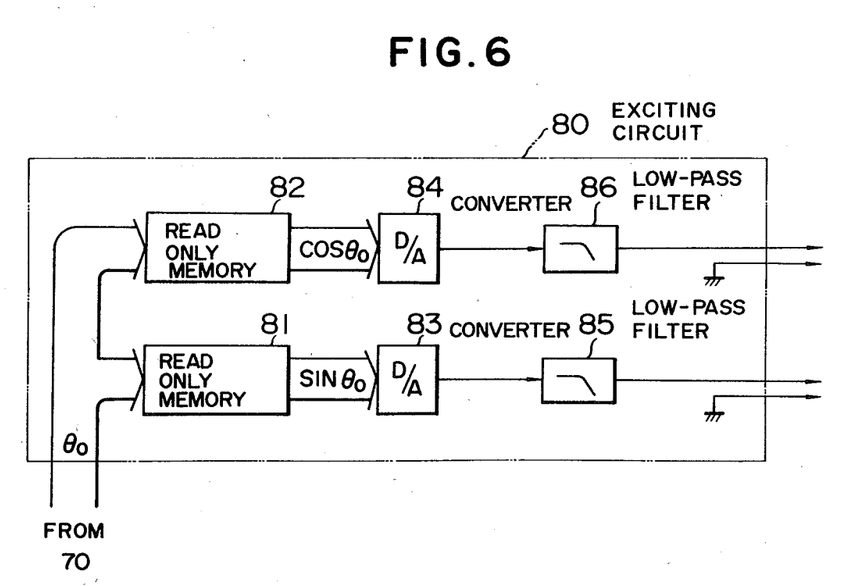
FIG. 6 is a block diagram showing the internal construction of an example of the exciting circuit 80 shown in FIG. 1.

FIG. 6 shows an internal construction of an example of the exciting circuit 80, which comprises a pair of read only memories (ROM's) 81, 82 which receive, as an address, the high order 8 bits among the 15 bits of the signal $\theta_0$ from the frequency divider 70. Stored at the 256 ($=2^8$) addresses whose values are equal to the high order 8 bits of $\theta_0$ are the values of $\sin\theta_0$. Stored at the 256 ($=2^8$) addresses whose values are equal to the high order 8 bits of $\theta_0$ are the values of $\cos\theta_0$. When the high order 8 bits of $\theta_0$ are inputted as the address to the ROM's 81, 82, the contents of the address are outputted in the form of digital signals indicative of $\sin\theta_0$ and $\cos\theta_0$. The successions of the digital signals $\sin\theta_0$ and $\cos\theta_0$ respectively form sine and cosine waveforms, i.e., two phase sinusoidal waves.

Digital-analog converters (hereinafter referred to as D/A converters) 83, 84 receive the digital signals and convert them into analog signals with 256 steps in each cycle. Low-pass filters 85, 86 receive the analog signals from the D/A converters 83, 84 and remove the stepping changes from the waveforms to produce continuously varying sinusoidal waveforms.

It will be appreciated that the use of the low-pass filters 85, 86 makes it unnecessary to use all of the 15 bits of $\theta_0$ in determining $\sin\theta_0$ and $\cos\theta_0$, but requires only the 8 bits. As a result, the ROM's 81, 82 need to have only 256 ($=2^8$) addresses or bytes, instead of $2^{15}$ of them which would be required if all of the 15 bits were used.

Figure 7:
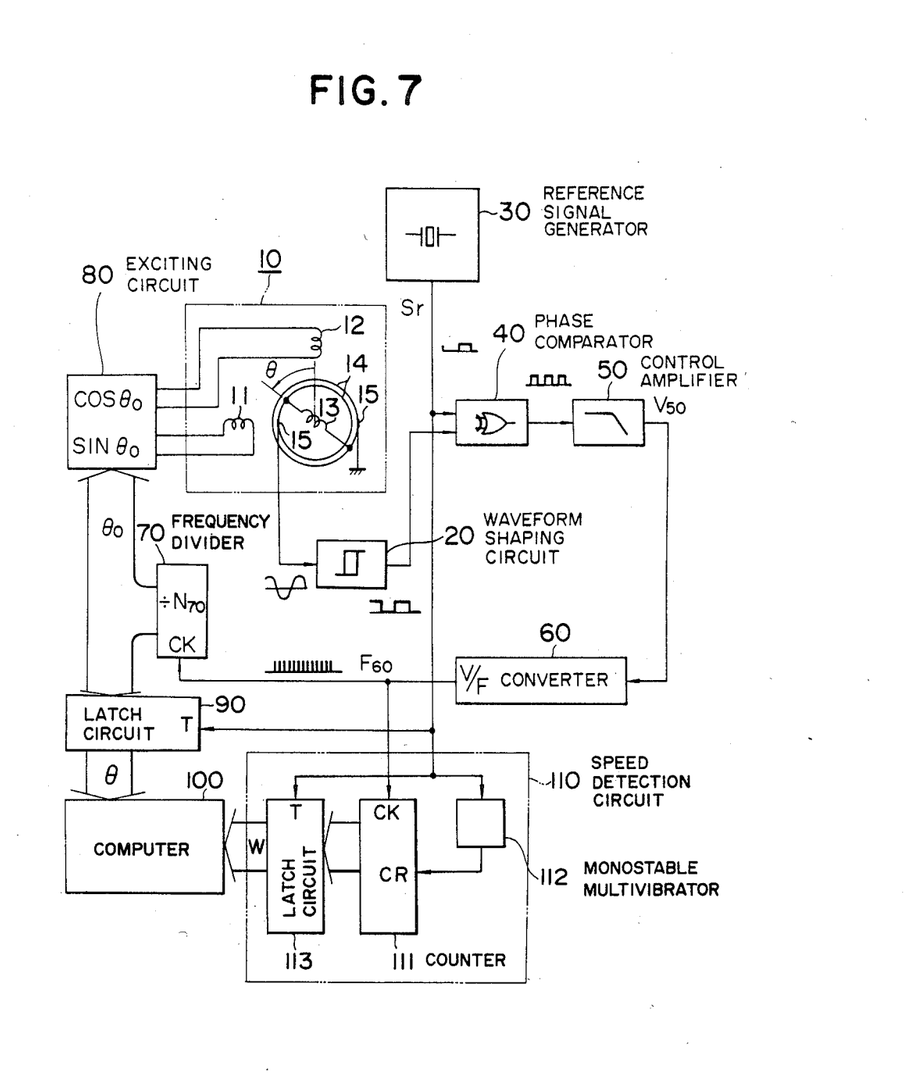
FIGS. 7–9 are block diagrams showing other embodiments of the invention.

FIG. 7 shows another embodiment of the invention. The reference numerals identical to those in FIG. 1 denote identical or similar components. As will be seen, a speed detection circuit 110 is added, which comprises a counter 111 of 15 bits which receives and counts the output pulses from the V/F converter 60. A monostable multivibrator 112 receives the reference signal Sr, and upon the occurrence of the trailing edge of the signal Sr, it is triggered into a quasi-stable state and returns to the original stable state after a short delay time. This delay time is shorter than one cycle of the output (when it is of the highest frequency) of the V/F converter 60. The counter 111 receives at the clear terminal CR the output of the monostable multivibrator 112, and when the monostable multivibrator 112 returns to the original stable state the counter 111 is cleared. A latch circuit 113 receives the output of the counter 111. It also receives, at the timing terminal T, the reference signal Sr. When the trailing edge of the signal Sr occurs, the latch circuit 113 stores the count value of the counter 111. Immediately thereafter, i.e., upon the elapse of the delay time, the monostable multivibrator 112 returns to the stable state and the counter 111 is thereby cleared.

It is assumed that the frequency of the reference signal Sr is 128 Hz and the output of the frequency divider 70 is 15 bits. For the speeds 0, 960, −960 rpm (hence 0, 16, −16 rps), the frequency of the output of the V/F converter 60 is 4,194,304 ($=2^{15}\times 128$) Hz, 4,718,592 ($=2^{15}\times(128+16)$) Hz, 3,670,016 ($=2^{15}\times(128-16)$) Hz, respectively. The number of pulses outputted from the V/F converter 60 and inputted into the counter 111 during the sampling period of 7.8 m sec. ($=1/128$ sec.) is 32,768; 36,864; 28,672; respectively. The counter 111 is of 15 bits and therefore overflows at the 32,768-th pulse. Accordingly, at the end of the sampling period, the count value of the counter 111 is 0 (32,768−32,768), 4,096 (36,864−32,768), 28,672. These values are stored by the latch circuit 113 and is in turn further processed in the computer 100.

As is usual, the digital values within the range of zero to half the full scale are treated as positive values and the digital values within the range of the maximum to the half value are treated as negative values with the magnitude being equal to the difference between the maximum value and the digital value in question. Accordingly, the obtained value 4,096 is treated as positive 4,096, and the obtained value 28,672 is treated as negative 4,096 ($=32,768-28,672$).

As has been explained, the embodiment described above, provides digital values indicative of the speed, so that the computer 100 need not perform arithmetic operation to determine the speed, so that software load can be reduced.

Figure 8:
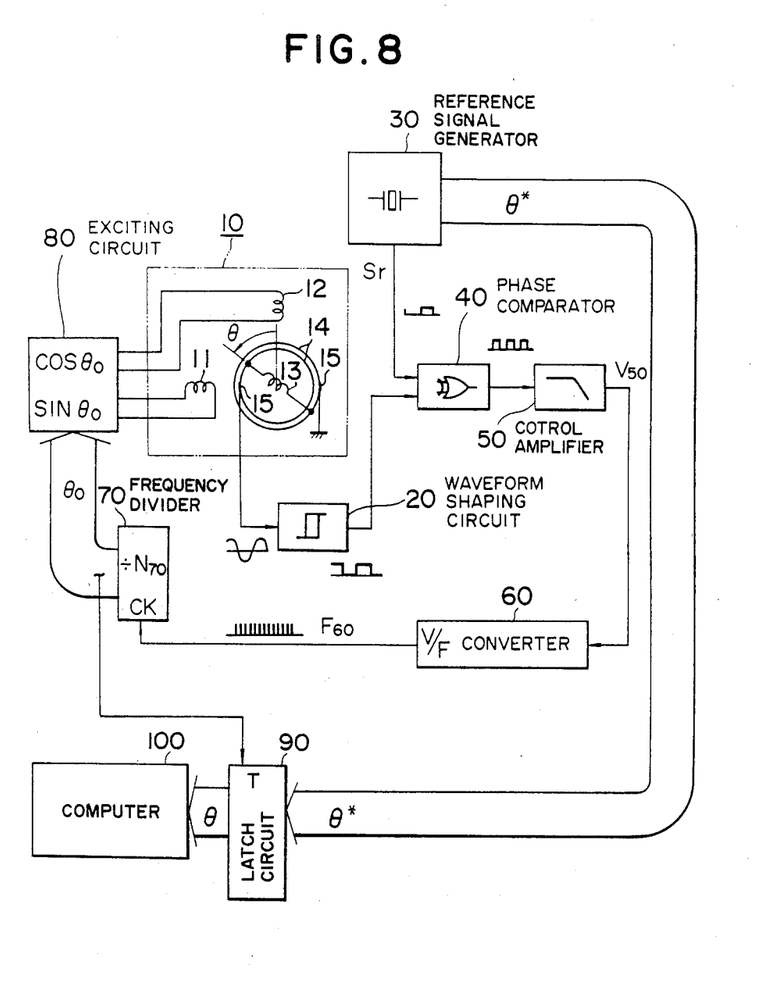

FIG. 8 shows another embodiment of the invention, in which the reference numerals identical to those in FIG. 1 denote identical or similar components.

The reference signal generator 30 of this embodiment produces not only the reference signal Sr, but also a reference signal phase signal indicative of the phase $\theta^*$. The latch circuit 90 receives the reference signal phase signal $\theta^*$. It also receives the highest order bit of $\theta_0$, and when the trailing edge of that bit signal occurs, i.e., when $\theta_0=0$, it stores the value of $\theta^*$. As has been explained previously, when $\theta_0=0$, $\theta^*=-\theta$. Thus, the latch circuit 90 stores the value indicative of $-\theta$, i.e., a value indicative of the position with a minus sign.

Figure 9:
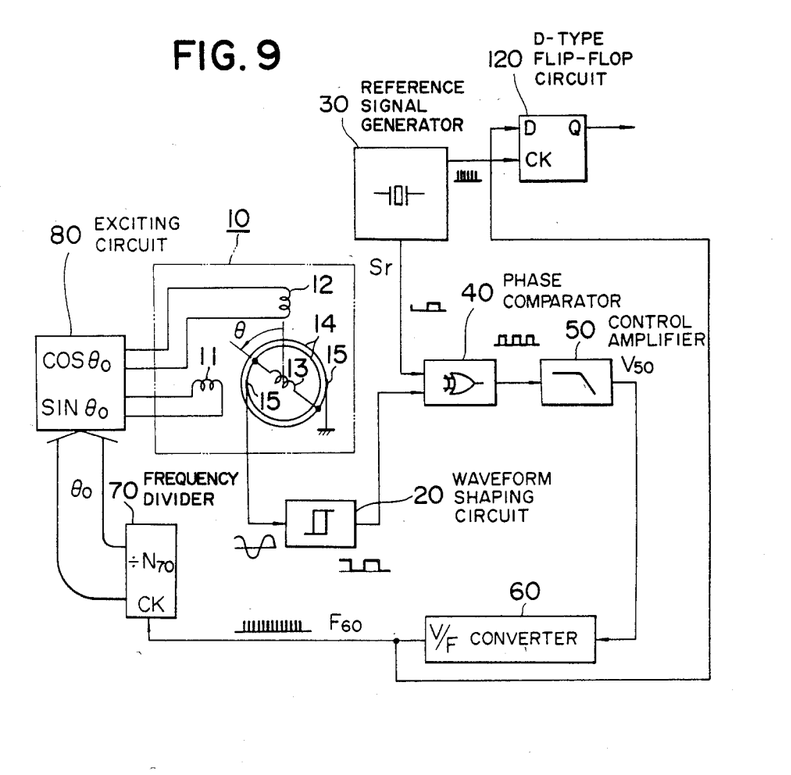

FIG. 9 shows another embodiment of the invention, for providing pulses in synchronism with the rotation of the body under detection. The reference numerals identical to those in FIG. 1 denote identical or similar components.

A pulse comparator 120 is added, which comprises a D-type flip-flop circuit which receives, at the clock terminal CK, the output pulses from the oscillating circuit 32 within the reference signal generator 30 having the internal construction of FIG. 5, and receives, at the data terminal D, the output pulses from the V/F converter 60.

Figure 10A:
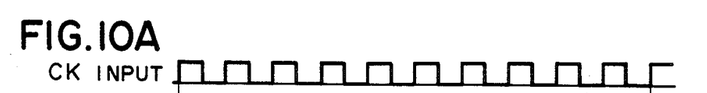
FIGS. 10A–10C are time-charts showing the operation of the D-type flip-flop circuit 120 shown in FIG. 9.
Figure 10B:
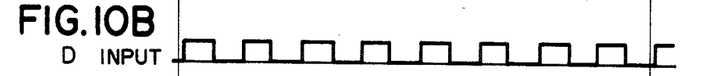
Figure 10C:
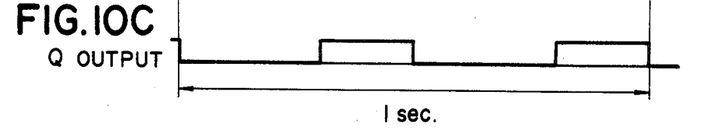

When receiving pulses of different frequencies at the terminals CK and D, the D-type flip-flop circuit 120 operates, in a manner as illustrated in FIG. 10, to produce pulses of the difference frequency at the output terminal Q.

In FIG. 10, it is assumed, for the sake of simplicity, that pulses of 10 Hz are applied to the terminal CK and pulses of 8 Hz are applied to the terminal D. In this case, as will be understood from FIG. 10, the pulses of 2 Hz appear at the output terminal Q.

In the example of FIG. 5, the output of the oscillating circuit 32 is of a frequency $32,768\times f^*$. The output of the V/F converter 60 is of a frequency $32,768 \times f_0$. Accordingly, the output of the flip-flop circuit 120 is of a frequency $32,768\times(f_0-f^*)$. As explained previously, $f_0-f^*=f$, hence the output of the flip-flop circuit 120 is of a frequency $32,768\times f$, in other words, pulses of a frequency which is 32,768 times the frequency f corresponding to the rotational speed of the body under detection are produced. Thus, the arrangement is obtained which is equivalent to a rotary pulse generator producing 32,768 pulses per revolution, and can therefore be utilized for movement detection at a high resolution.

With the embodiments which have been described above, as the detection resolution is raised or the detection response time is shortened, the minute AC components in the output of the control amplifier 50 due to the frequency of the output of the phase comparator 40 become problematical, and undesirable fluctuation occurs in the frequency of the output of the V/F converter 60, and hence in the resultant digital values to be detected.

Figure 11:
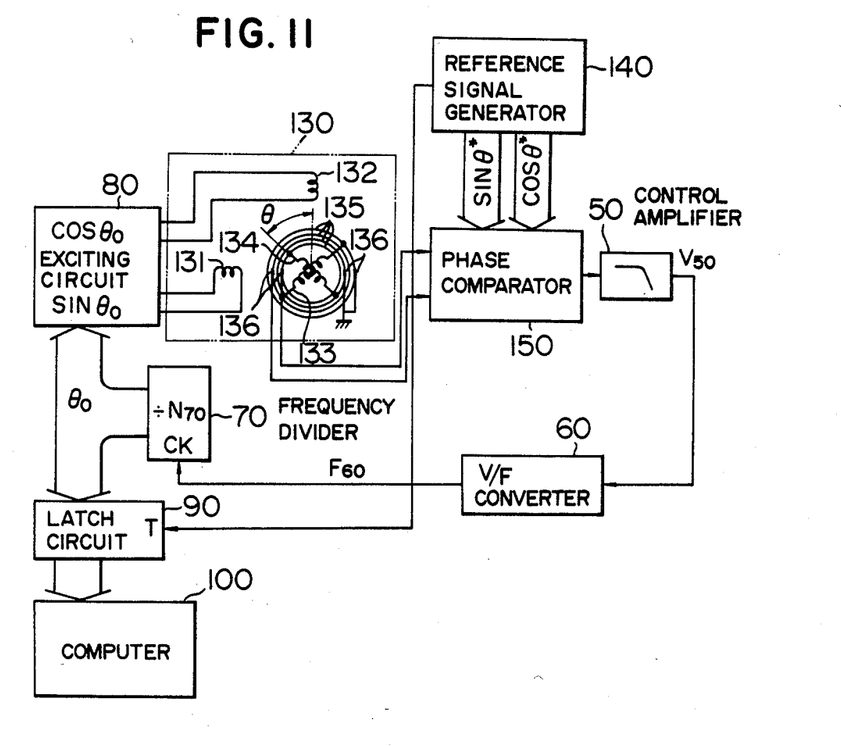
FIG. 11 is a block diagram showing a further embodiment of the invention.

FIG. 11 shows a further embodiment of the invention which can reduce the above-mentioned fluctuation. The reference numerals identical to those in FIG. 1 denote identical or similar components. In this embodiment, the rotor is also provided with two-phase windings 133, 134, and two pairs of slip rings 135 and two pairs of brushes 136 are used to conduct the voltages induced in the windings 133, 134.

A reference signal generator 140, substituting the reference signal generator 30, produces a pair of digital signals whose values are sin $\theta^*$ and cos $\theta^*$, with $\theta^*$ changing at a constant rate.

A phase comparator 150 compares the phases of the analog outputs from the windings 133, 134 with the digital outputs from the reference signal generator 140, and produces an analog output indicative of the phase difference.

Figure 12:
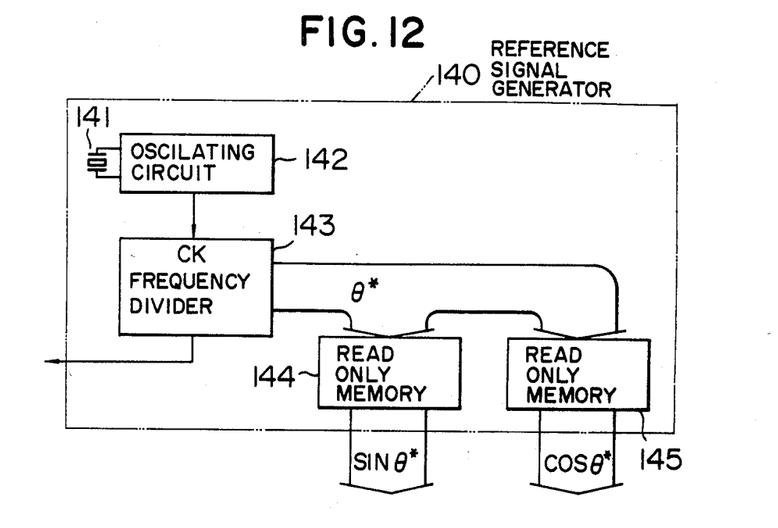
FIG. 12 is a block diagram showing the internal construction of an example of the reference signal generator 140 shown in FIG. 11.

FIG. 12 shows the internal construction of an example of the reference signal generator 140. In addition to the components 31, 32 and 33, similar to those denoted by identical reference numerals in FIG. 5, there are provided read only memories (ROM's) 144, 145, which store, at the addresses whose values are identical to the values of $\theta^*$, the values of sin $\theta^*$ and cos $\theta^*$, respectively. When they receive the digital signal $\theta^*$ from the frequency divider 33, they produce digital signals of values sin $\theta^*$ and cos $\theta^*$, respectively.

Figure 13:
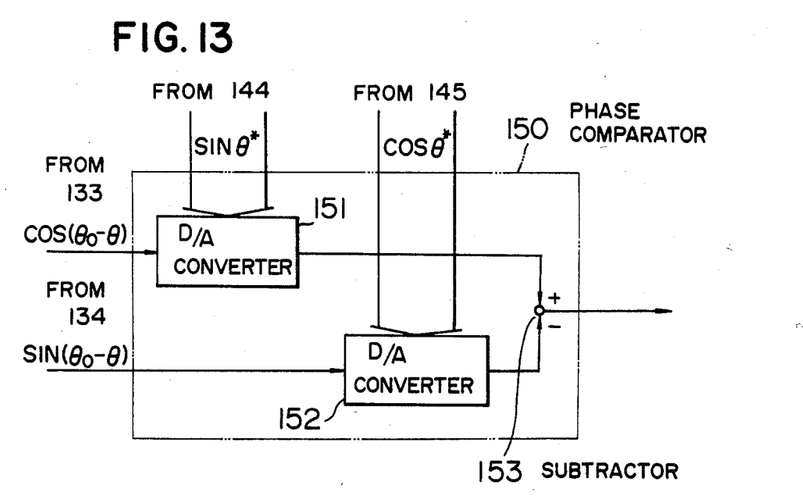
FIG. 13 is a block diagram showing the internal construction of an example of the phase comparator 150 shown in FIG. 11.

FIG. 13 shows the internal construction of an example of the phase comparator 150 which comprises multiplying digital-to-analog (D/A) converters 151 and 152, each of which has a function of multiplying the analog input signal by a digital input signal. An example of commercially available converter having such a function is an integrated circuit AD7523 supplied by Analog Devices, Inc., U.S.A. Supplied as the digital input signals to the converters 151 and 152 are those indicative of $\sin \theta^*$ and $\cos\theta^*$ from the reference signal generator 140. Supplied as the analog input signals are those indicative of $\cos(\theta_0-\theta)$ and $\sin(\theta_0-\theta)$ from the windings 134 and 133. The outputs of the converters 151 and 152 are analog signals indicative of the products:

$$\sin \theta^* \times \cos(\theta_0-\theta), \text{ and}$$

$$\cos \theta^* \times \sin(\theta_0-\theta),$$

respectively. A subtractor 153 subtracts the output of the converter 152 from the output of the converter 153, i.e., to perform the operation:

$$\sin \theta^* \times \cos(\theta_0-\theta) - \cos \theta^* \times \sin(\theta_0-\theta)$$

to obtain $$\sin\{\theta^* - (\theta_0-\theta)\}.$$

Thus an analog signal indicative of the difference between $\theta^*$ and $(\theta_0-\theta)$ is obtained. The difference signal is supplied to the control amplifier 50.

The rest of the construction and the operation is similar to that described with reference to FIG. 1.

It will be appreciated that as far as the difference $\theta^*-(\theta_0-\theta)$ is relatively small, $\sin(\theta^*-(\theta_0-\theta))$ is linearly related to $(\theta^*-(\theta_0-\theta))$, and as far as the magnitude of the difference $\theta^*-(\theta_0-\theta)$ does not exceed 90°, $\sin(\theta^*-(\theta_0-\theta))$ increases with increase of $(\theta^*-(\theta_0-\theta))$. As a result, control to approach $\sin(\theta^*-(\theta_0-\theta))$ to zero amounts to control to approach $(\theta^*-(\theta_0-\theta))$ to zero.

In the embodiment described above, the phase comparator 150 receives sinusoidal waveform signals, so that the AC components contained in the output of the phase comparator 150 are those due to stepping changes of the digital values $\sin \theta^*$ and $\cos \theta^*$. Accordingly, the AC components are at relatively high frequencies, so that the cut-off frequency of the control amplifier 50 can be made higher and the arrangement for low-pass filter operation is made simpler, but elimination of the AC components is ensured. As a result, there will be less fluctuation in the frequency of the V/F converter 60, the detection response time becomes shorter, and the detection accuracy is improved.

It will be appreciated that one may incorporate the synchro generator 130, the reference signal generator 140 and the phase comparator 150 shown in FIG. 11, into the system shown in FIG. 7 to obtain a speed detection system; into the system shown in FIG. 8 to obtain a position detection system; or into the system shown in FIG. 9 to obtain a pulse generating system.

In the embodiments described, the slip rings and brushes are used to connect the windings on the rotor with a circuit external to the synchro generator. But, a rotary transformer may be used in place.

In the embodiments described above, the primary windings are provided on the stator and the secondary winding is provided on the rotor. But, alternatively, the primary windings may be provided on the rotor and the secondary winding may be provided on the stator.

In the embodiments described, the pole pair number of the synchro generator is 1. But, a synchro generator having m (m>1) pairs of poles may alternatively be used. In this case, mechanical rotational angle $\theta$ is reflected to electrical angle of $m\theta$, so that the detection resolution becomes $1/m$.

The invention is also applicable where a linear-type synchro generator, rather than the rotary-type synchro generator as described, is used to detect the position and the speed of linear movement.

What is claimed is:

1. A system for detecting position and speed of a body under detection comprising:
   a synchro generator having a plurality of primary windings and at least one secondary winding, at least one of (i) said secondary winding and (ii) said plurality of primary windings being coupled to said body,
   an exciting circuit for providing exciting current to said primary windings,
   said secondary winding inducing a signal when said primary windings are excited,
   a reference signal generator for providing a reference signal of a predetermined frequency,
   first means responsive to the reference signal and the induced signal from said secondary winding, for producing pulses at a frequency which changes depending on the phase difference between the reference signal and the induced signal,
   a frequency-divider counting said pulses and producing a first digital signal indicative of the count value at each moment, said first digital signal representing a phase angle of said exciting current,
   said exciting circuit being responsive to the first digital signal from the frequency-divider to determine the instantaneous value of the exciting current at each moment,
   said synchro generator, said reference signal generator, said first means, said frequency-divider and said exciting circuit forming a phase-locked loop controlling the induced signal so as to be in a predetermined phase-relationship with the reference signal, and
   second means responsive to one of (i) a said reference signal generated by said reference signal generator and a said first digital signal produced by said frequency-divider and (ii) pulses produced by said first means, for producing a second digital signal relating to at least one of the position and speed of said body under detection.

2. A system as set forth in claim 1, wherein the frequency of the pulses produced by said first means is kept constant as long as the induced signal is in said predetermined phase-relationship with the reference signal, the frequency of said pulses is decreased as the induced signal advances in phase, and the frequency of said pulses is increased as the induced signal retards in phase.

3. A system as set forth in claim 1, wherein said exciting circuit comprises memory means receiving, as an address, the count value from said frequency-divider and producing, as said instantaneous value, the content stored at the address, the succession of the contents thus produced forming a sinusoidal signal.

4. A system as set forth in claim 1, wherein said second means comprises means responsive to the reference signal generator and the frequency-divider for determining the difference between the phase angles of the outputs thereof, said difference being indicative of the position of the body under detection and said second digital signal being indicative of said difference.

5. A system as set forth in claim 4, wherein said second means comprises a latch circuit receiving the count value from the frequency-divider and the reference signal from the reference signal generator, and storing the count value when the reference signal is at a predetermined phase angle, said second digital signal being indicative of the count value stored in said latch circuit.

6. A system as set forth in claim 4, wherein said reference signal generator comprises means for providing a third digital signal indicative of the phase angle of the reference signal, and said second means comprises a latch circuit receiving the third digital signal from the reference signal generator and at least part of the output of the frequency-divider and storing the third digital signal when the output of the frequency-divider is at a predetermined phase angle.

7. A system as set forth in claim 1, wherein said second means receives the reference signal and the pulses from said first means and produces a digital signal indicative of the speed of the body under detection.

8. A system as set forth in claim 7, wherein said second means comprises a counter counting the pulses from said first means, a latch circuit receiving the count value from the counter and the reference signal, and storing the count value when the reference signal is at a predetermined phase angle, and means receiving the reference signal and clearing the counter immediately after the count value is stored by the latch circuit.

9. A system as set forth in claim 1, wherein said reference signal generator comprises means generating clock pulses at a predetermined frequency, and a frequency-divider counting the clock pulses and producing a frequency-divided signal, said frequency-divided signal being used as said reference signal.

10. A system as set forth in claim 9, wherein said second means is responsive to the clock pulses from the reference signal generator and the pulses from said first means for producing pulses at a frequency equal to the difference between the frequencies of the clock pulses and the pulses from said first means.

11. A system as set forth in claim 10, wherein said second means comprises a D-type flip-flop circuit receiving the clock pulses and the pulses from said first means at the clock pulse input terminal and at the data input terminal, and producing said pulses at the difference frequency.

12. A system as set forth in claim 1, wherein said first means comprises a phase comparator comparing the phases of the reference signal and the induced signal for producing an analog signal indicative of the phase difference between the two signals, and a voltage-to-frequency converter for producing pulses at a frequency which changes depending on said analog signal.

13. A system as set forth in claim 12, wherein said first means further comprises a control amplifier which receives said analog signal and has proportional plus integral gain, said voltage-to-frequency converter receiving the output of said control amplifier.

14. A system as set forth in claim 12 or 13, wherein:
there are provided two secondary windings for producing two-phase sinusoidal signals having a phase $\sin(\theta_0 - \theta)$ and $\cos(\theta_0 - \theta)$ respectively, said reference signal generator produces two-phase sinusoidal signals having a phase $\sin \theta^*$ and $\cos \theta^*$ respectively, and said phase comparator comprises a first multiplier for multiplying the signal from one of the secondary windings having the phase $\cos(\theta_0 - \theta)$ and one of the signals from the reference signal generator having the phase $\sin \theta^*$ to produce a signal related to $\sin \theta^* \times \cos(\theta_0 - \theta)$, a second multiplier for multiplying the signal from the other secondary winding having the phase $\sin(\theta_0 - \theta)$ and the other signal from the reference signal generator having the phase $\cos \theta^*$ to produce a signal related to $\cos \theta^* \times \sin(\theta_0 - \theta)$, and means responsive to the output signals from the first and second multipliers for producing an analog signal related to the difference:

$$\sin \theta^* \times \cos(\theta_0 - \theta) - \cos \theta^* \times \sin(\theta_0 - \theta)$$
$$= \sin\{\theta^* - (\theta_0 - \theta)\}$$

which analog signal is used as the output of said phase comparator.

15. A system as set forth in claim 14, wherein:
said reference signal generator comprises means generating clock pulses at a predetermined frequency, a frequency-divider counting the clock pulses and producing a digital signal indicative of the count value at each moment, first memory means receiving the count value as the address and producing the content stored at the address, and second memory means receiving the count value as the address and producing the content stored at the address, the successions of the contents produced by said first and second memory means forming two-phase sinusoidal signals.

16. A system as set forth in claim 15, wherein:
each of said multipliers comprises a multiplying digital-to-analog converter receiving at an analog input terminal one of the signals from the synchro generator and at a digital input terminal one of the signals from the reference signal generator and producing an analog signal related to the product of the inputted analog and digital signals.

17. The system as in claim 1, wherein said exciting current provided by said exciting circuit has a frequency which varies as a function of a deviation of said induced signal from said reference signal, and said reference signal has a predetermined constant frequency.

* * * * *